United States Patent [19]

Sheppard

[11] Patent Number: 4,710,080
[45] Date of Patent: Dec. 1, 1987

[54] CLAMPING APPARATUS FOR MAKING AN IMPROVED ELECTRICAL CONNECTION

[76] Inventor: Howard H. Sheppard, 7430 Sprague St., Philadelphia, Pa. 19119

[21] Appl. No.: 644,304

[22] Filed: Aug. 24, 1984

Related U.S. Application Data

[62] Division of Ser. No. 417,240, Sep. 13, 1982, Pat. No. 4,482,782.

[51] Int. Cl.[4] ................... F16B 39/02; H01R 4/02
[52] U.S. Cl. ..................... 411/82; 411/511; 411/530; 439/874
[58] Field of Search ............... 411/152, 157, 82, 258, 411/943, 513, 511, 530; 339/275 C, 276 C

[56] References Cited

U.S. PATENT DOCUMENTS

| | | | |
|---|---|---|---|
| 1,189,235 | 7/1916 | Brown | 174/84 C |
| 1,999,082 | 4/1935 | Buechting | 411/157 |
| 2,333,968 | 11/1943 | Winter | 411/82 |
| 2,359,083 | 9/1944 | Carlson | 140/113 |
| 2,446,542 | 8/1948 | MacInnes | 174/94 R |
| 2,529,343 | 11/1950 | Lamb | 411/157 |
| 2,664,844 | 1/1954 | Siegrist et al. | 339/275 C |
| 2,715,716 | 8/1955 | Woolley, Jr. | 339/276 |
| 2,815,497 | 12/1957 | Redslob | 339/276 |
| 3,146,519 | 9/1964 | Redwine | 29/155.55 |
| 3,216,091 | 11/1965 | Floyd, Jr. | 29/155.55 |
| 3,243,763 | 3/1966 | Elliott . | |
| 3,643,008 | 2/1972 | Brazee | 174/107 |

FOREIGN PATENT DOCUMENTS

| | | | |
|---|---|---|---|
| 665491 | 6/1965 | Belgium | 411/513 |

Primary Examiner—Gary L. Smith
Assistant Examiner—Neill Wilson
Attorney, Agent, or Firm—Michael F. Petock

[57] ABSTRACT

The method of providing an improved soldered electrical connection includes the step of providing a ring over an electrical wire and a terminal which are to be soldered together, and then compressing the ring to form a mechanical connection between the wire and the terminal prior to soldering. The mechanical connection holds the wire for a substantial length against the terminal and prevents movement during the soldering thereby insuring against a cold solder joint. Preferably, the ring is divided with the free ends preferably being offset to provide ease in sliding past each other. Preferably, a specially designed tool is utilized to compress the ring, the tool being provided with specially designed grooves in its jaws for holding the ring on end.

5 Claims, 9 Drawing Figures

CLAMPING APPARATUS FOR MAKING AN IMPROVED ELECTRICAL CONNECTION

This is a division of application Ser. No. 417,240, filed Sept. 13, 1982 by the inventor herein and entitled "METHOD, TOOL AND APPARATUS FOR AN IMPROVED SOLDERED ELECTRICAL CONNECTION", now U.S. Pat. No. 4,482,782.

BACKGROUND OF THE INVENTION

The present invention is directed to a method, apparatus and tool for providing an improved soldered electrical connection. More particularly, the present invention is directed to a ring which is provided over an electrical wire and terminal, and compressed before soldering, by the use of a special tool.

The soldering of wires to terminals to make electrical connections has been used for many years. A relatively common problem in the soldering of wires to terminals is the production of cold soldered joints. Cold soldered joints often result from the movement of the wire relative to the terminal prior to the cooling of the solder. Attempts in the past to obviate this problem have included the winding of the wire around the terminal prior to soldering. However, the winding of a wire around the terminal has proved to result in other problems. For example, in the event of a severe overheating due to a severe electric current overload, the solder may melt and the wire wound around the terminal may unwind due to the spring force of the wound wire. Upon cooling, the soldered connection is not properly remade due to the unwinding, and therefore, a good electrical connection is not maintained.

SUMMARY OF THE INVENTION

The present invention provides a method, apparatus and tool for the making of an improved soldered electrical connection between a terminal and wire. The present invention provides several advantages, inter alia, the making of a strong mechanical connection between the wire and the terminal before soldering the wire to the terminal. This mechanical connection insures that a substantial length of the wire is maintained in intimate contact with a substantial length of the terminal. The mechanical connection prevents movement of the wire during the soldering process thereby preventing the formation of cold solder joints. Cold solder joints are typically caused by the movement of the wire before the solder has cooled thereby resulting in a high resistance electrical connection and generally a poor electrical connection. The mechanical connection provides the additional advantage of maintaining the wire in contact with the terminal in the case of a severe overheating of the electrical connection, which might even result in the melting of the solder. Such overheating might occur on a severe electrical overload. In such a case, an electrical connection is maintained by means of the mechanical connection, and, a new soldered electrical connection, of good quality, may be maintained due to the fact that the wire is held without movement in its normal position against the terminal by means of the compressed ring connector of the present invention.

Briefly, in accordance with the method of the present invention, an improved method of making an electrical connection between a wire and a terminal includes the step of providing a ring, preferably a split ring, having an inside diameter of sufficient dimension to allow said ring to fit over a terminal to which a wire is to be bonded. The method further includes the step of installing the split ring over the terminal, the wire to be bonded being inserted within the ring in juxtaposition to the terminal. The method further includes the step of compressing the split ring onto the terminal and the wire to form a mechanical connection between the terminal and the wire, and then soldering at least the wire to the terminal. Preferably, the split ring is provided with a solderable surface and the terminal, wire and compressed ring may be soldered together as a unit. Further, in accordance with a preferred method of the present invention, a tool may be utilized which is provided with pivoted jaws having slots formed therein for receiving the ring on end.

Further, in accordance with the present invention, the ring is preferably divided radially with the free ends thereof being offset one from the other to enable the sliding of the ends past each other upon compression of the ring. Preferably, the inside diameter of the ring is selected to provide minimal clearance over the terminal. In the case of terminals having a "T" shape, as is common, the inside diameter of the split ring is preferably selected to provide minimal clearance over the top of the "T" of the "T" shaped terminal whereby after compression of the split ring, the compressed split ring is locked under the top of the "T" shape of the terminal.

Further, in accordance with a preferred embodiment of the present invention, the inside diameter of the ring is selected to provide clearance over the top of a "T" of a "T" shaped terminal and is selected of minimal dimensions so that when it is placed over the terminal and a wire to be soldered is inserted between the inside diameter of the ring and the terminal, the ring is drawn under the top portion of the "T" of the "T" shaped terminal so that the rings may not be slipped off the top of the terminal with the wire in place.

In accordance with the present invention, a tool is provided for the making of the improved soldered electrical connection. The tool comprises a pair of members pivoted together between their ends. Each member is provided with a mating jaw formed at one end and a handle at the other. A longitudinal slot is provided in each jaw for receiving a split ring on end. The split ring may therefore be conveniently held for mounting over the terminal and during the process of inserting the wire to be soldered therein. The handles of the tool may then be conveniently pressed together to compress the split ring onto the terminal and the wire to be soldered.

It is understood that the term solder means any metal or metalic alloy used when melted to join metalic surfaces and soldering means the uniting of elements by the use of such solder.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities shown.

DETAILED DESCRIPTION OF THE PREFERRED EMBODIMENTS

Figure 1:
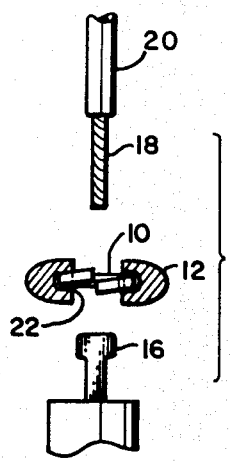
FIGS. 1 through 4 are elevation views, with the tool shown in cross-section similar to that of FIG. 7, of several of the steps of making an improved soldered electrical connection in accordance with the present invention.

Referring now to the drawings in detail wherein like numerals indicate like elements, there is shown in FIGS. 1 through 4 several of the steps in the method of making an improved soldered electrical connection. Referring to these Figures, there is shown a split ring 10 held within the jaws 12 of a tool 14. The split ring 10 is being inserted on a terminal 16. An electrical wire 18 having insulation 20 is shown being mechanically connected to the terminal.

Referring now particularly to FIG. 1, there is shown a split ring 10 held on end within the grooves or slots 22 formed within jaws 12 of tool 14.

Figure 2:
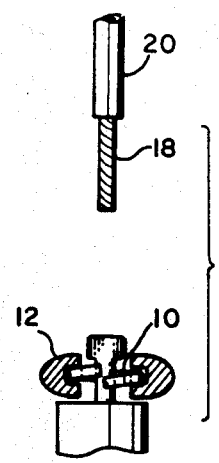
Figure 3:
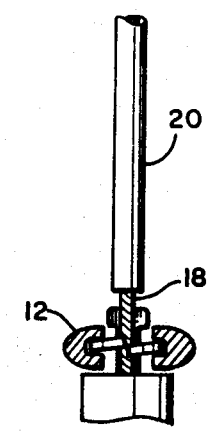

The split ring 10 is about to be placed over terminal 16. This is illustrated in FIG. 2. The wire 18 may be then inserted along the length of terminal 16 and through split ring 10. Pressure may then be applied to the handles 24 (FIG. 6) of tool 14 to compress split ring 10 onto wire 18 and terminal 16.

Although the aforesaid steps are deemed to be the preferred and best manner of practicing the method of the present invention with respect to the forming of a mechanical bond between the wire and the terminal, it is understood that the steps may be carried out in differing sequences within the scope of the present invention. For example, the wire 18 may be first placed through split ring 10, and then wire 18 and split ring 10 inserted over terminal 16.

Figure 4:
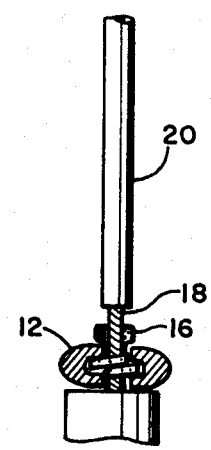

Once the mechanical connection between the wire 18 and the terminal 16 is made, as illustrated in FIG. 4, the wire 18 is soldered to terminal 16. Preferably, split ring 10 is provided with a solderable surface, and split ring 10, wire 18 and terminal 16 may be soldered together as a unit.

Figure 5:
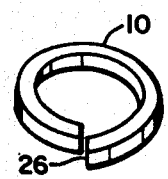
FIG. 5 is a view in perspective of a split ring utilized in the making of an improved soldered electrical connection in accordance with the present invention.

The split ring 10 is further illustrated in FIG. 5. As may be seen from FIG. 5, taken in conjunction with the other figures in the drawing, split ring 10 is comprised of a ring which is divided or split radially at 26. The free ends of the split or divided ring 10 are offset one from the other to aid in or allow the free ends to slide past each other upon compression of the ring. This is particularly well illustrated in FIGS. 2 through 4. Split ring 10 may be comprised of any suitable material which is bendable so that the ring may be compressed and has sufficient rigidity so that it retains its bent or compressed condition to provide sufficient force on wire 18 and terminal 16 to retain wire 18 against terminal 16 (i.e. plastically compressable). Preferably, split ring 10 may be comprised of bronze, or other suitable material. Preferably, the material of split ring 10, such as bronze, may be tinned to enhance the solderability of split ring 10.

Figure 9:
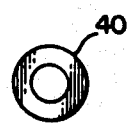
FIG. 9 is a plan view of an unsplit ring, which may be substituted for the split rings shown in FIGS. 1 thru 8.

Although a split ring structure, such as split ring 10, with offset free ends is a preferred embodiment of the present invention, it is understood that a ring may be utilized which is not radially divided, such as ring 40 in FIG. 9. Ring 40 may be utilized in the same manner as described throughout for split ring 10 except that there would be no free ends which would readily slide past each other upon compression of the ring. Instead, ring 40 would be compressed upon the terminal and the wire causing bending and deformation of the ring structure so that the wire is compressed and held tight against the terminal. Preferably, ring 40 may be comprised of a somewhat more deformable material, such as copper, rather than bronze, but other suitable materials, including bronze, may be utilized. As in the case of split ring 10, ring 40 may be tinned to enhance the solderability of ring 40. The dimensions of ring 40 may be selected with the same considerations as set forth above and hereinafter with respect to ring 10.

Figure 6:
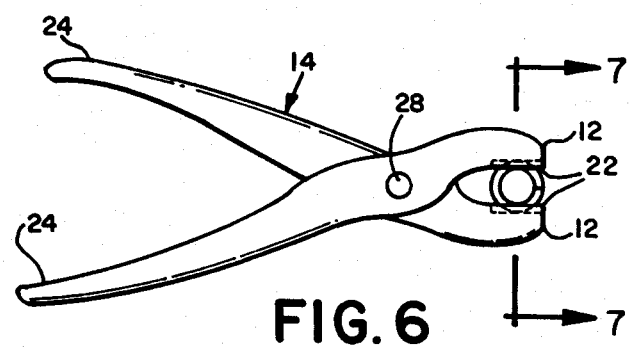
FIG. 6 is an elevation view of a tool, with a split ring held on end in the jaws thereof, used in the making of an improved soldered electrical connection in accordance with the present invention.
Figure 7:
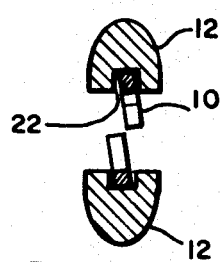
FIG. 7 is a cross sectional view taken along line 7—7 of FIG. 6.

Referring to FIG. 6, there is shown a tool which may be of substantial benefit and assistance in carrying out the method of the present invention, especially where the method and apparatus of the present invention in producing the improved electrical connections are to be carried out rapidly and efficiently, for example, in a production assembly line. The tool as illustrated in FIG. 14 is comprised of two members pivoted together between their ends at point 28. The members are provided with handles 24 at one end and with mating jaws 12 at the opposite end. The jaws 12 are provided with mating longitudinal slots 22 for receiving split ring 10 on end therein. This is illustrated further in FIG. 7, along with the illustrations of FIGS. 1 through 4. Preferably, the depth of slots 22 is equal to the width of the member making up split ring 10. In other words, as may be seen in FIGS. 6 and 7, the depth of the slot 22 is preferably selected so that the remainder of the jaw extends to the inside diameter of split ring 10. By such selection of the slot depth, the possibility of excessive pressure of the ring on the wire and the terminal is prevented, thereby avoiding any possible cutting of the wire during compression of the ring. However, the invention herein is not limited to this best mode, and other slot depths may be used in practicing the invention with or without a stop means.

Figure 8:
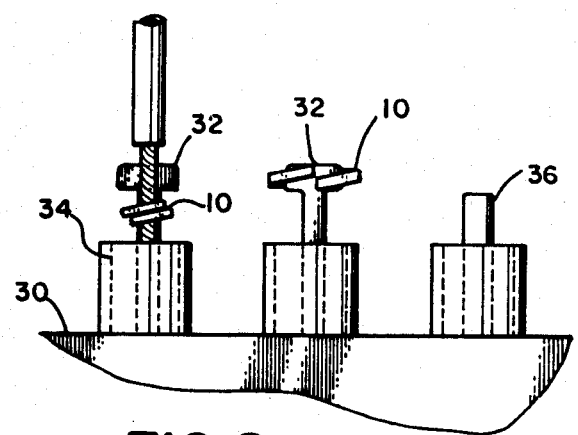
FIG. 8 is an elevation view of a portion of a terminal board having several terminals thereon with a wire mechanically connected to one of the terminals in accordance with the present invention.

Referring to FIG. 8, there is shown a terminal block 30 provided with "T" shaped terminals 32. The "T" shaped terminal 32 is shown extending (in dotted lines) within an insulative cylinder as is conventional on terminal blocks. As shown on the middle terminal, the inside diameter of split ring 10 is preferably selected to provide minimum clearance over the top of the "T" terminal. By preferably selecting a split ring 10 having an inside diameter which provides minimal clearance over the top of the "T" terminal, compression of split ring 10 results in the ring being locked under the top of the "T" as shown in the left terminal. Although the locking of the compressed split ring 10 under the top of the "T" terminal is desirable, the present invention may be utilized with straight terminals 36 as shown in FIG. 8. In such a case, the compression of the split ring on the straight terminal and the wire provides a sufficiently strong friction bond between the wire and the terminal to hold the wire mechanically bonded to the terminal.

Additionally, in the case of "T" shaped terminals, the inside diameter of the ring is selected to clear the top of the "T" of the terminal and so that when it is placed on the terminal and the wire is inserted between the inside diameter and the terminal, the ring is drawn under the top of the "T" of the "T" shaped terminal, and the ring may not be slipped off the top of the terminal with the wire in place. The ring may then be compressed and the terminal, wire and ring soldered together as described above. In this manner, the ring is locked in place prior to soldering, and is permanently locked in place after soldering.

The present invention as described provides a number of significant advantages in the making of a soldered electrical connection between a wire and a terminal. In accordance with the present invention, the wire to be soldered to the terminal is firmly held against a substantial length of the terminal during the soldering process without any movement between the wire and the terminal. This insures a good soldered connection between the wire and a substantial length of the terminal. The prevention of movement during the soldering helps insure against the formation of a cold soldered joint. Furthermore, once the electrical connection is put into use, a substantial degree of protection is provided against the possibility of an electrical connection being lost during an overheating of the electrical connection. This is so because the wire is firmly maintained in its normal position in contact with the terminal by means of the mechanical connection formed by the compressed split ring. This also enables a good soldered connection to be reformed upon the cooling of the soldered terminal after the overheating condition passes. Furthermore, with the use of the tool of the present invention, electrical connections in accordance with the present invention may be made even more rapidly than by the conventional method of attempting to hold a wire in contact with the terminal during the soldering process.

The present invention may be embodied in other specific forms without departing from the spirit or essential attributes thereof and, accordingly, reference should be made to the appended claims, rather than to the foregoing specification as indicating the scope of the invention.

I claim:

1. Clamping apparatus for use in making an improved soldered electrical connection between a wire and a terminal, comprising:
   a ring shaped structure;
   said ring shaped structure being comprised of a metallic material of a composition sufficiently malleable to be radially inwardly and plastically compressable over a terminal and a wire and of a sufficient rigidity to retain the deformed shape as compressed such that it is adapted to hold a wire tightly against a terminal;
   said ring shaped structure being comprised of a member, said ring shaped structure having an outside and an inside diameter and a thickness measured perpendicular to said diameters, said ring member having a width dimension measured as the difference between an outside radius and an inside radius in the direction of the diameter, both of said diameters being large relative to said thickness and the thickness of the ring member measured perpendicular to a diameter being equal to or less than said width dimension;
   said ring shaped structure being adapted to be applied over a terminal and a wire by a tool having a pair of mating jaws with slots therein, said width of said ring member being selected to be substantially equal to the depth of the slot in each of said mating jaws;
   said ring shaped structure being provided with a radial slit or division at one location providing for a first and second free end wherein said first and second free ends of said ring shaped structure are offset in the direction perpendicular to said diameters one from the other to increase the ease of the free ends sliding past each other upon compression of the ring shaped structure over a terminal and a wire; and
   said metallic ring shaped structure being provided with a layer of tinning material to enable the soldering of said ring, wire and terminal together as a unit.

2. Clamping apparatus in accordance with claim 1 wherein said metallic ring shaped structure is comprised of a copper alloy.

3. Clamping apparatus in accordance with claim 2 wherein said copper alloy is bronze.

4. Clamping apparatus in accordance with claim 1 wherein said tinning layer is comprised of tin.

5. Clamping apparatus in accordance with claim 1 wherein said tinning layer is comprised of an alloy of tin.

* * * * *